(12) United States Patent
Pyun et al.

(10) Patent No.: US 9,753,432 B2
(45) Date of Patent: Sep. 5, 2017

(54) OPTICAL HEAD FOR HOLOGRAM OPTICAL APPARATUS AND METHOD OF OPERATING THE SAME

(71) Applicant: SAMSUNG ELECTRONICS CO., LTD., Suwon-si (KR)

(72) Inventors: Kyoung-seok Pyun, Seoul (KR); Chil-sung Choi, Suwon-si (KR); Alexander Morozov, Moscow region (RU); Jung-kwuen An, Cheonan-si (KR); Sun-il Kim, Seoul (KR); Ivan Bovsunovskiy, Moscow (RU); Andrew Putilin, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 277 days.

(21) Appl. No.: 14/079,983

(22) Filed: Nov. 14, 2013

(65) Prior Publication Data

US 2014/0132999 A1 May 15, 2014

(30) Foreign Application Priority Data

Nov. 14, 2012 (KR) .................. 10-2012-0129091

(51) Int. Cl.
*G03H 1/10* (2006.01)
*G03H 1/02* (2006.01)
(Continued)

(52) U.S. Cl.
CPC ......... *G03H 1/0402* (2013.01); *G03H 1/0476* (2013.01); *G03H 1/16* (2013.01); *G03H 2001/048* (2013.01); *G03H 2210/22* (2013.01); *G03H 2222/18* (2013.01); *G03H 2222/34* (2013.01); *G03H 2223/16* (2013.01)

(58) Field of Classification Search
CPC .. G03H 1/2294; G03H 1/2286; G03H 1/0005; G03H 1/0402; G03H 1/0465; G03H 2223/16; G03H 2001/0415; G03H 1/0408; G03H 2223/55; G03H 1/0476; G03H 1/16; G03H 2001/048; G03H 2210/22;
(Continued)

(56) References Cited

U.S. PATENT DOCUMENTS 7,046,892 B2 5/2006 Yoshikawa et al.
7,321,540 B2 1/2008 Goulanian et al.
(Continued)

*Primary Examiner* — Jade R Chwasz
(74) *Attorney, Agent, or Firm* — Sughrue Mion, PLLC

(57) ABSTRACT

An optical head for a hologram optical apparatus and a method of operating the same are provided. The optical head for the hologram optical apparatus includes a reference light unit for guiding reference light, a signal light unit for guiding signal light, and a light source unit for providing 1 the reference light and the signal light to the reference light unit and the signal light unit, wherein the reference light unit and the signal light unit are stacked. The signal light unit includes: a plurality of optical waveguides stacked sequentially; composite hologram optical elements and lighting hologram optical elements disposed on the plurality of optical waveguides; an optical modulator for modulating light output from the plurality of the optical waveguides; and a lens for condensing light output from the optical modulator onto a recording layer.

23 Claims, 4 Drawing Sheets

(51) Int. Cl.
*G03H 1/00* (2006.01)
*G03H 1/04* (2006.01)
*G03H 1/16* (2006.01)

(58) Field of Classification Search
CPC ........... G03H 2222/18; G03H 2222/34; G02B 2027/0174; G02F 1/01; G02F 2203/12
USPC .... 359/9, 10, 11, 12, 22, 29, 30, 32, 31, 34, 359/35, 27
See application file for complete search history.

(56) References Cited

U.S. PATENT DOCUMENTS

| | | | |
|---|---|---|---|
| 8,054,519 B2* | 11/2011 | Su | G02B 5/32 359/10 |
| 8,605,562 B2 | 12/2013 | Pyun et al. | |
| 2003/0137706 A1 | 7/2003 | Rmanujam et al. | |
| 2012/0092980 A1* | 4/2012 | Ostroverkhov | G11B 7/28 369/103 |
| 2013/0050789 A1 | 2/2013 | Pyun et al. | |
| 2013/0050790 A1 | 2/2013 | Sung et al. | |
| 2014/0055830 A1 | 2/2014 | Pyun et al. | |
| 2014/0063578 A1 | 3/2014 | Pyun et al. | |

* cited by examiner

OPTICAL HEAD FOR HOLOGRAM OPTICAL APPARATUS AND METHOD OF OPERATING THE SAME

CROSS-REFERENCE TO RELATED APPLICATION

This application claims priority from Korean Patent Application No. 10-2012-0129091, filed on Nov. 14, 2012, in the Korean Intellectual Property Office, the disclosure of which is incorporated herein in its entirety by reference.

BACKGROUND

1. Field

Apparatuses and methods consistent with exemplary embodiments relate to an optical apparatus, and more particularly, to an optical head for a hologram optical apparatus and a method of operating the same.

2. Description of the Related Art

A reference light and a signal light are used for hologram recording. Hologram technology is used for various applications such as printing, image displays, information recording, and advertising.

Since a reference light and a signal light are used for hologram recording, a head of an optical system for hologram recording includes optical elements for generating, processing and coupling of the reference light and the signal light. As in other fields, miniaturization and integration are also becoming main issues in the optical apparatus field. Since an optical head is the core of the hologram recording apparatus, miniaturization of the optical head may precede the miniaturization of the hologram recording apparatus as a whole. For color hologram recording, red light R, green light G and blue light B are used. The optical head includes optical elements for receiving and processing the R, G and B light simultaneously, and separating, enlarging and beam-shaping the processed light. Therefore the optical elements are necessary to be integrated in order to miniaturize the optical apparatus for color holograms. In this process, however, factors such as optical interference or optical crosstalk may arise, which may result in deterioration of hologram quality.

SUMMARY

One or more exemplary embodiments may provide an optical head for a hologram apparatus, which is capable of achieving miniaturization or integration and reducing a crosstalk that occurs in optical mixing.

One or more exemplary embodiments may provide methods of operating the optical head.

Additional aspects will be set forth in part in the description which follows and, in part, will be apparent from the description, or may be learned by practice of the presented embodiments.

According to an aspect of an exemplary embodiment, an optical head for a hologram optical apparatus includes a reference light unit for guiding reference light for hologram recording; a signal light unit for guiding signal light for hologram recording; and a light source unit for providing the reference light and the signal light, wherein the reference light unit and the signal light unit are sequentially stacked.

The signal light unit may include a plurality of optical waveguides stacked sequentially; a composite hologram optical element and lighting hologram optical element disposed on each of the plurality of optical waveguides; an optical modulator for modulating light emitted from the plurality of optical waveguides; and a lens for condensing light output from the optical modulator on a recording layer, wherein the composite hologram optical element and lighting hologram optical element each form a single layer hologram.

The signal light unit may include a single optical waveguide into which the light from the light source unit is incident; a composite hologram optical element and a lighting hologram optical element disposed on the single optical waveguide; a single optical modulator for modulating light output from the single optical waveguides; and a lens for condensing light emitted from the single optical modulator on a recording layer, wherein the composite hologram optical element and the lighting hologram optical element each form a three layer hologram having layers corresponding to red, greed, and blue light.

The plurality of optical waveguides may include three optical waveguides corresponding respectively to red, green, and blue light and being sequentially stacked.

The composite hologram optical element and the lighting hologram optical element may both be disposed on a top surface or a bottom surface of each of the plurality of optical waveguides.

The lens may be a Fourier lens.

The composite hologram optical elements disposed on each of the optical waveguides may not overlap each other.

Thicknesses of the composite hologram optical elements provided to each of the optical waveguides may be the same as or different from each other.

Thicknesses of the lighting hologram optical elements provided to each of the optical waveguides may be the same as or different from each other.

Thicknesses of the composite hologram optical element and the lighting hologram optical element for each of the optical waveguides may be the same as or different from each other.

Refractive index modulations of the composite hologram optical elements for each of the optical waveguides may be the same as or different from each other.

The lens may be a holographic Fourier lens.

The reference light unit may include: an optical waveguide; an upper hologram optical element disposed on a top surface of the optical waveguide; and a lower composite hologram optical element disposed on a bottom surface of the optical waveguide.

The upper and lower composite hologram optical elements respectively may each include a three layer hologram.

The light source unit may include: first, second, and third light sources; a reflection unit reflecting light emitted from the first, second, and third light sources; and a mirror reflecting light incident from the reflection unit to the signal light generating unit.

The first, second, and o third light sources may each be lasers emitting different colors, respectively.

The reflection unit may include a mirror and a beam splitter.

The lasers of the first, second, and third light sources may each be a continuous wave (CW) laser or a quasi CW laser.

The first, second, and third light sources may directly scan light onto the composite hologram optical elements.

According to an aspect of another exemplary embodiment, a method is provided for operating the optical head for a hologram optical apparatus according to the above description. The method includes adjusting at least one of a thickness and a refractive index modulation of the composite hologram optical elements, wherein the signal light generating unit includes at least: an optical waveguide; and a composite hologram optical element and a lighting hologram optical element each disposed on the optical waveguide.

The optical waveguide may include a plurality of optical waveguides which are sequentially stacked; and the composite hologram optical element and the lighting hologram optical element disposed on each of the optical waveguides may each respectively comprise a single layer hologram.

The optical waveguide may be a single optical waveguide; and the composite hologram optical element and the lighting hologram optical element may each include a three layer hologram.

The composite hologram optical elements may be disposed so as not to overlap each other.

The method further includes scanning light to each of the composite hologram optical elements at a certain time intervals.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
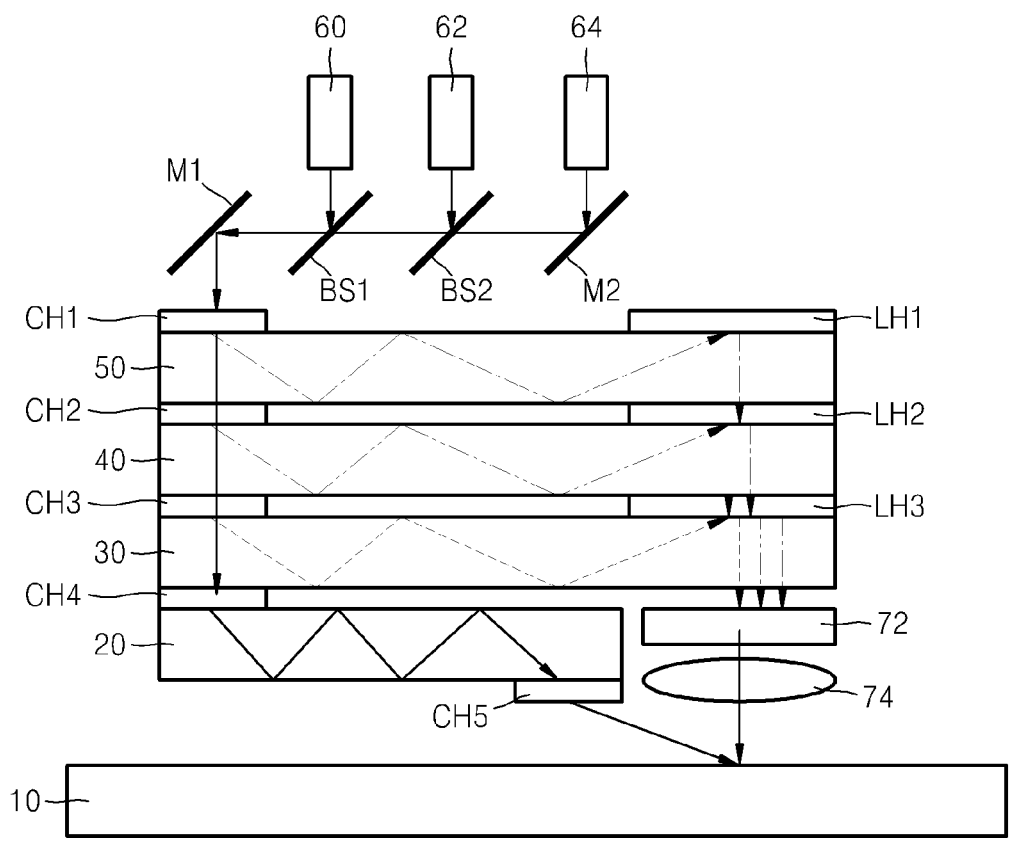
FIG. 1 is a cross-sectional view illustrating an optical head for a color hologram optical apparatus according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list. In the drawings, the thicknesses of layers and regions are exaggerated for clarity. It will also be understood that when a layer is referred to as being "on" another layer or substrate, it can be directly on the other layer or substrate, or intervening layers may also be present Like reference numerals in the drawings denote like elements, and thus their description will be omitted.

FIG. 1 is a cross-sectional view illustrating an optical head (hereinafter a first optical head) for a color hologram optical apparatus according to an exemplary embodiment.

Referring to FIG. 1, the first optical head includes first to fourth optical waveguides 20, 30, 40 and 50, which are stacked in order. The first to fourth optical waveguides 20, 30, 40 and 50 may be formed to be spaced from each other or in contact with one another. The first optical waveguide 20 is used for generating a reference beam. The second to fourth optical waveguides 30, 40 and 50 are used for generating a signal light. The first optical waveguide 20 may have a length shorter than the second to fourth optical waveguides 30, 40 and 50. The second optical waveguide 30 is for a blue light B. The third optical waveguide 40 is for a green light G. The fourth optical waveguide 50 is for a red light R. An optical modulator 72 is disposed adjacent to the first optical waveguide 20 under the second optical waveguide 30. The optical modulator 72 may be a spatial light modulator (SLM). A condensing lens 74 is disposed under the optical modulator 72. The condensing lens 74 may be a Fourier lens. The condensing lens 74 condenses light onto a predetermined region on a hologram recording layer 10. The recording layer 10 may be positioned at a focal length of the condensing lens 74. The optical modulator 72 and the condensing lens 74 are aligned on a same optical axis.

A first composite hologram optical element CH1 and a first lighting hologram optical element LH1 are formed on a top surface of the fourth optical waveguide 50. The first composite hologram optical element CH1 and the first lighting hologram optical element LH1 are separated from each other. The first lighting hologram optical element LH1 may have a greater surface area than the first composite hologram optical element CH1. The first composite hologram optical element CH1 and the first lighting hologram optical element LH1 may be formed in the same layer. The first composite hologram optical element CH1 diffracts red light (indicated as an alternated long and short dash line) of the incident light (mixed light of R+G+B) and guides the red light into the fourth optical waveguide 50 and transmits the remainder of the incident light. The red light diffracted by the first composite hologram optical element CH1 travels along the fourth optical waveguide 50 and is incident on the first lighting hologram optical element LH1. The first lighting hologram optical element LH1 diffracts the incident red light into collimated light and directs the collimated light towards the third optical waveguide 40. A second composite hologram optical element CH2 and a second light hologram optical element LH2 are separately disposed on a top surface of the third optical waveguide 40. The second composite hologram optical element CH2 may be disposed immediately under the first composite hologram optical element CH1. The second lighting hologram optical element LH2 may be disposed immediately under the first lighting hologram optical element LH1. The second composite hologram optical element CH2 diffracts green light (indicated as an alternated long and two short dashes line) of the incident light transmitted through the first composite hologram optical element CH1 onto a predetermined position in the third optical waveguide 40 and transmits the remainder of the incident light. The diffracted green light travels along the third optical waveguide 40 and is incident on the second lighting hologram optical element LH2. The second lighting hologram optical element LH2 diffracts the incident green light into collimated light and directs the collimated light toward the second optical waveguide 30. The second composite hologram optical element CH2 and the second lighting hologram optical element LH2 may be formed in a single layer.

A third composite hologram optical element CH3 and a third lighting hologram optical element LH3 are separately disposed on a top surface of the second optical waveguide 30. The third composite hologram optical element CH3 may be formed immediately under the second composite hologram optical element CH2. The third lighting hologram optical element LH3 may be formed immediately under the second lighting hologram optical element LH2. The second and third lighting hologram optical elements LH2 and LH3 respectively may have a same area as that of the first lighting hologram optical element LH1. The third composite hologram optical element CH3 diffracts blue light (indicated as a dotted line) of the incident light transmitted through the second composite hologram optical element CH2 in a predetermined direction in the second optical waveguide 30 and transmits the remainder of the incident light. The diffracted blue light travels along the second optical waveguide 30 and is incident on the third lighting hologram optical element LH3. The third lighting hologram optical element LH3 diffracts the incident blue light into collimated light and directs the collimated light toward the optical modulator 72.

The collimated light (indicated as an alternated long and short dash line) output from the first lighting hologram optical element LH1 is transmitted through the second light hologram optical element LH2, the third optical waveguide 40, the third lighting hologram optical element LH3 and the second optical waveguide 30, and is incident on the optical modulator 72. The collimated light (indicated as an alternate long and two short dashes line) output from the second lighting hologram optical element LH2 is transmitted through the third optical waveguide 40, the third lighting hologram optical element LH3 and the second optical waveguide 30, and is incident on the optical modulator 72. Accordingly the red collimated light output from the first lighting hologram optical element LH1, the green collimated light output from the second lighting hologram optical element LH2, and the blue collimated light output from the third lighting hologram optical element LH3 are incident on the optical modulator 72 together. Namely, the optical modulator 72 receives white light. The modulated light transmitted through the optical modulator 72 is used as a signal light and is focused on a predetermined position on the recording layer 10 by the condensing lens 74.

A fourth composite hologram optical element CH4 is formed on a top surface of the first optical waveguide 20. The fourth composite hologram optical element CH4 may be formed under the third composite hologram optical element CH3. The first to fourth composite hologram optical elements CH1 to CH4 may be aligned on a same vertical line, one above the other. The fourth composite hologram optical element CH4 diffracts white light, which passes through the first to third composite hologram optical elements CH1 to CH3 and the second to fourth optical waveguides 30, 40 and 50 and is incident on the fourth composite hologram optical element CH4, in a predetermined direction in the first optical waveguide 20. The fourth composite hologram optical element CH4 may include three laminated layers. At this time, the three layers may be hologram layers for diffracting the incident red light, green light and blue light in a predetermined direction in the first optical waveguide 20. Light (indicated by a solid line) diffracted from the fourth composite hologram optical element CH4 into the first optical waveguide 20 travels along the first optical waveguide 20 and is output through a bottom surface of the first optical waveguide 20 at the end of the first optical waveguide 20 in the light traveling direction. A fifth composite hologram optical element CH5 is formed on the bottom surface of the first optical waveguide 20 through which the light is output. The fifth composite hologram optical element CH5 diffracts the white light output through the bottom surface of the first optical waveguide 20 and focuses the light onto a predetermined position on the hologram recoding layer 10. The light output from the fifth composite hologram optical element CH5 is used as a reference light. On the hologram recording layer 10, the predetermined position on which the reference light is focused may be identical to a position on which the signal light, condensed by the condensing lens 74, is focused.

First to third light sources 60, 62 and 64 are disposed above an upper side of the fourth optical waveguide 50, and spaced from the fourth optical waveguide 50. The first to third light sources 60, 62 and 64 may be respectively a light source emitting red light, a light source emitting green light and a light source emitting blue light. Each of the first to third light sources 60, 62 and 64 may be, for example, a continuous wave (CW) laser or a quasi CW laser.

A first mirror M1 is disposed immediately above the first composite optical element CH1. A second mirror M2 is disposed under the third light source 64. The first and second mirrors M1 and M2 face each other and are aligned along the same optical axis. First and second beam splitters BS1 and BS2 are disposed on the same optical axis between the first and second mirrors M1 and M2. The first and second beam splitters BS1 and BS2 are disposed respectively under the first and second light sources 60 and 62. The first mirror M1 reflects a white light emitted and mixed from the first to third light sources 60, 62 and 64 and directs the white light onto the first composite hologram optical element CH1. Light emitted from the first light source 60 is reflected by the first beam splitter BS1 and is incident on the first mirror M1. Light emitted from the second light source 62 is reflected by the second beam splitter BS2, is transmitted through the first beam splitter BS1 and is incident on the first mirror M1. Light emitted from the third light source 64 is reflected by the second mirror M2, is transmitted through the second and first beam splitters BS2 and BS1, and is incident on the first mirror M1. The first and second mirrors M1 and M2, and the first and second beam splitters BS1 and BS2, together may be a reflecting unit.

The second to fourth optical waveguides 30, 40 and 50, the first to third composite hologram optical elements CH1, CH2 and CH3, and the first to third lighting hologram optical elements LH1, LH2 and LH3 in FIG. 1 may, together, be a signal light generating unit. The first optical waveguide 20, and the fourth and fifth composite hologram optical element CH4 and CH5 may, together, be a reference light generating unit.

Figure 2:
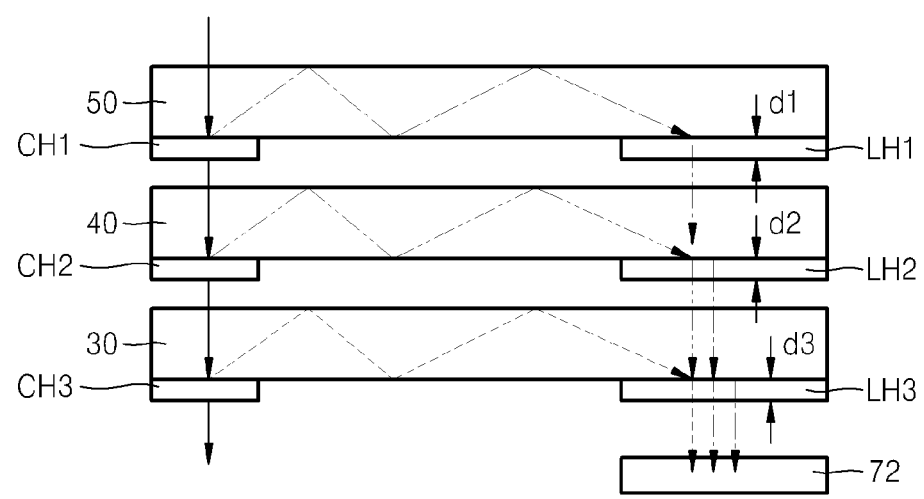
FIG. 2 is a cross-sectional view illustrating a modified example of a signal light generating unit in the optical head of FIG. 1.

FIG. 2 illustrates a modified example of the signal light generating unit of FIG. 1.

Referring to FIG. 2, the first composite hologram optical element CH1 and the first lighting hologram optical element LH1 are attached to a bottom surface of the fourth optical waveguide 50, and operations thereof are the same as in FIG. 1. The first composite hologram optical element CH1 and the first lighting hologram optical element LH1 are spaced from the third optical waveguide 40. The second composite hologram optical element CH2 and the second lighting hologram optical element LH2 are attached to a bottom surface of the third optical waveguide 40, and operations thereof are the same as in FIG. 1. The second composite hologram optical element CH2 and the second lighting hologram optical element LH2 are spaced from the second optical waveguide 30. The third composite hologram optical element CH3 and the third lighting hologram optical element LH3 are attached to a bottom surface of the second optical waveguide 30, and operations thereof are the same as in FIG. 1. The light output from the third composite hologram optical element CH3 is incident on the fourth composite hologram optical element CH4 and the path the light travels thereafter is the same as in FIG. 1. White light output from the third lighting hologram optical element LH3 is incident on the optical modulator 72 and the path the light travels thereafter is the same as in FIG. 1. Diffraction superposition of the mixed light may be adjusted according to a multiplication (d*Δn) of thicknesses d1, d2 and d3 of the first to third lighting hologram optical elements LH1, LH2 and LH3, and refractive index modulation for the light incident thereto, when the light is transmitted through the first to third lighting hologram optical elements LH1, LH2 and LH3 and is mixed together. Accordingly the diffraction superposition portions of the mixed light may be minimized by adjusting the thicknesses d1, d2 and d3, and the refractive index modulation Δn. Therefore crosstalk of the light may be minimized while the light is transmitted through the first to third lighting hologram optical elements LH1, LH2 and LH3 and is mixed together. Consequently, efficiency may be maximized. For similar reasons, crosstalk may be minimized by properly adjusting thicknesses of the first to third composite hologram optical elements CH1, CH2 and CH3 and the refractive index modulation thereof.

Figure 3:
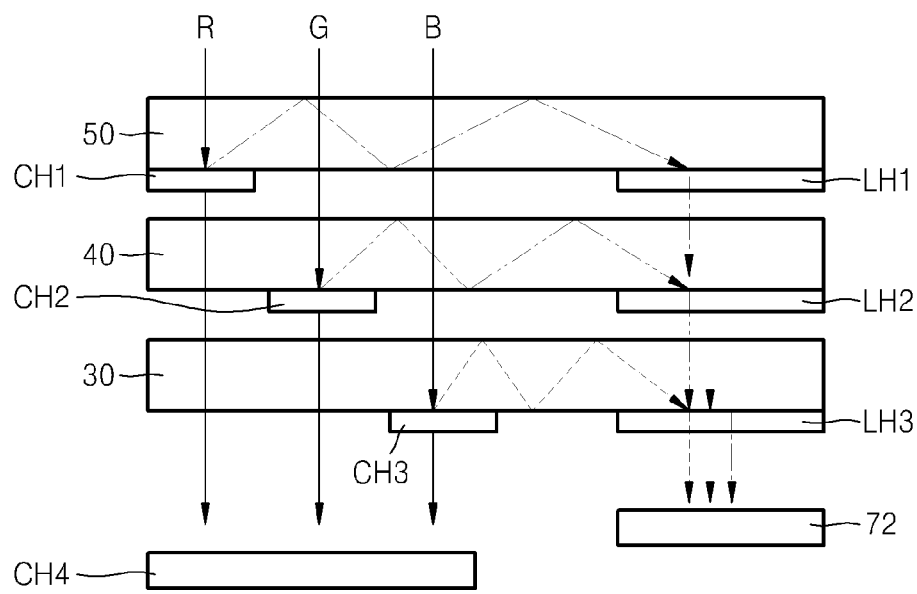
FIG. 3 is a cross-sectional view illustrating an optical head for a color hologram optical apparatus according to another exemplary embodiment.

FIG. 3 illustrates a main part of an optical head for a hologram optical apparatus according to another exemplary embodiment. Other parts may be the same as the optical head in FIG. 1.

Referring to FIG. 3, the first to third composite hologram optical elements CH1, CH2 and CH3 are not vertically aligned as shown in FIGS. 1 and 2. Namely, the first to third composite hologram optical elements CH1, CH2 and CH3 do not overlap. There are various other alignments other than the one shown in FIG. 3 in which the first to third composite hologram optical elements CH1, CH2 and CH3 do not overlap. For example, positions of the second and third composite hologram optical elements CH2 and CH3 may be exchanged. An alignment of the first to third lighting hologram optical elements LH1, LH2 and LH3 may be the same as shown in FIG. 1 or FIG. 2. The first to third composite hologram optical elements CH1, CH2 and CH3 are aligned so as not to overlap each other. Therefore the red light R, the green light G and the blue light B may be incident on the fourth composite hologram optical element CH4 without any interference with each other. Other features of this embodiment may be the same as the description in relation to FIG. 1. In FIG. 3, the red light R, the green light G and the blue light B may be directly incident on the first to third lighting hologram optical elements LH1, LH2 and LH3 from the first to third light sources 60, 62 and 64 without being transmitted through a mirror, a beam splitter or the like. The red light R, the green light G and the blue light B may be incident on the first to third lighting hologram optical elements LH1, LH2 and LH3 simultaneously or sequentially at time intervals.

Figure 4:
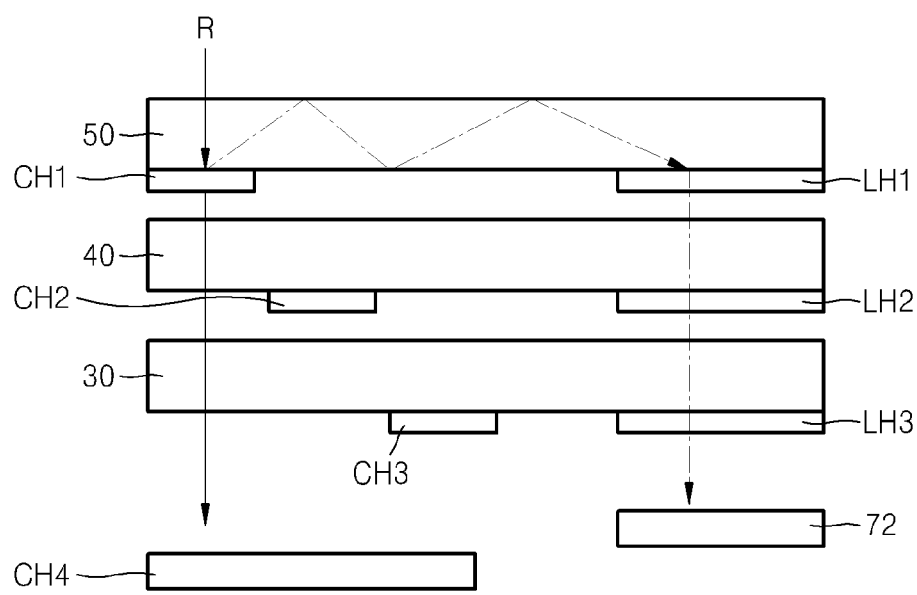
FIG. 4 is a cross-sectional view illustrating a case where red light is incident to a first composite hologram optical element and light is not incident to second and third composite hologram optical elements in FIG. 3.

FIG. 4 illustrates a case in which the red light R is incident on the first composite hologram optical element CH1 and light is not incident on the second and third composite hologram optical elements CH2 and CH3. Light incident on the second or the third composite hologram optical elements CH2 or CH3 may be performed after the incidence of the red light R.

Figure 5:
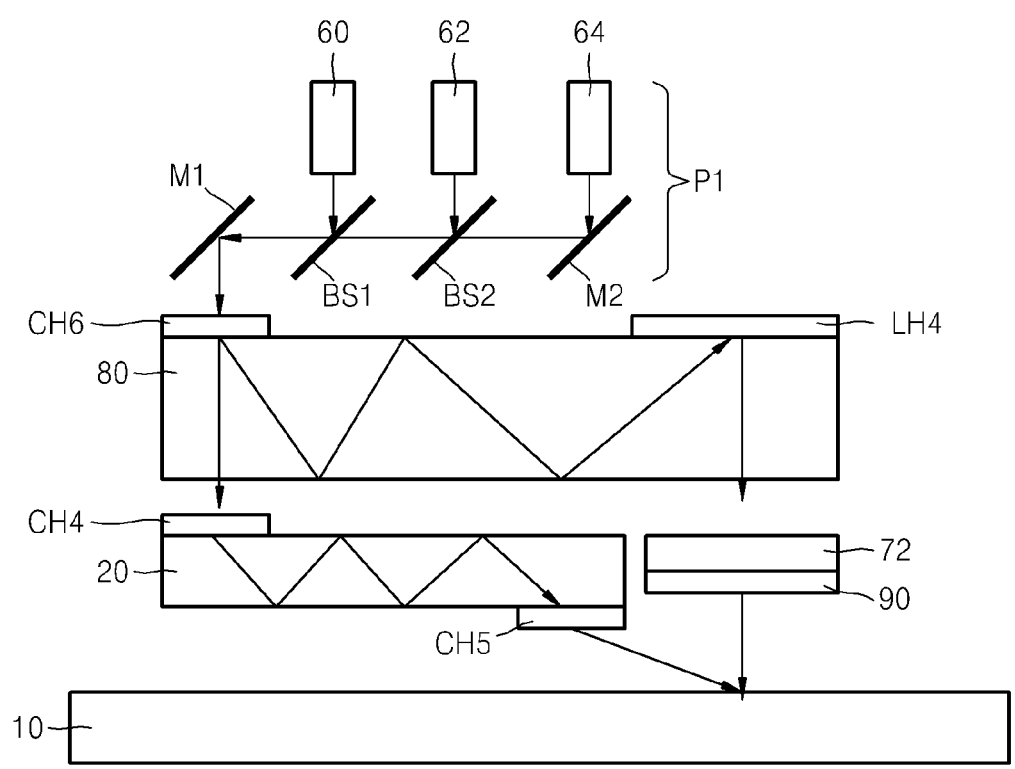
FIG. 5 is a cross-sectional view illustrating an optical head for a color hologram optical apparatus according to another exemplary embodiment.

FIG. 5 illustrates an optical head for a color hologram optical apparatus according to another exemplary embodiment. Here, a description of portions that are different from the optical head as shown in FIG. 1 will be given.

Referring to FIG. 5, a fifth optical waveguide 80 is disposed between a light source unit P1 and the first optical waveguide 20. The fifth optical waveguide 80 replaces the three optical waveguides 30, 40 and 50 in FIG. 1, a sixth composite hologram optical element CH6 and a fourth lighting hologram optical element LH4 are formed on a top surface thereof. The sixth composite hologram optical element CH6 and the fourth lighting hologram optical element LH4 may be formed on a bottom surface of the fifth optical waveguide 80 instead of the top surface. The sixth composite optical waveguide CH6 diffracts a portion of white light incident from the light source unit P1 in a predetermined direction of the fifth optical wave guide 80 and transmits the rest of the incident light and transfers it to the fourth composite hologram optical element CH4. Light diffracted into the fifth optical waveguide 80 travels along the fifth optical waveguide 80, is incident on the fourth lighting hologram optical element LH4, and is diffracted to be output as collimated light. The light output from the fourth lighting hologram optical element LH4 is incident on the optical modulator 72. The light incident on the optical modulator 72 is modulated and incident to a holographic Fourier lens 90. The holographic Fourier lens 90 diffracts the incident light to form an image on the recording layer 10. The holographic Fourier lens 90 replaces the condensing lens 74 in FIG. 1 and is disposed under the optical modulator 72. The holographic Fourier lens 90 may be disposed to contact with or be spaced from the optical modulator 72 on a same optical axis. In FIG. 5, the sixth composite hologram optical element CH6 and the fourth lighting hologram optical element LH4 respectively may include a three layer hologram. The three layer hologram may respectively correspond to R, G and B.

Figure 6A:
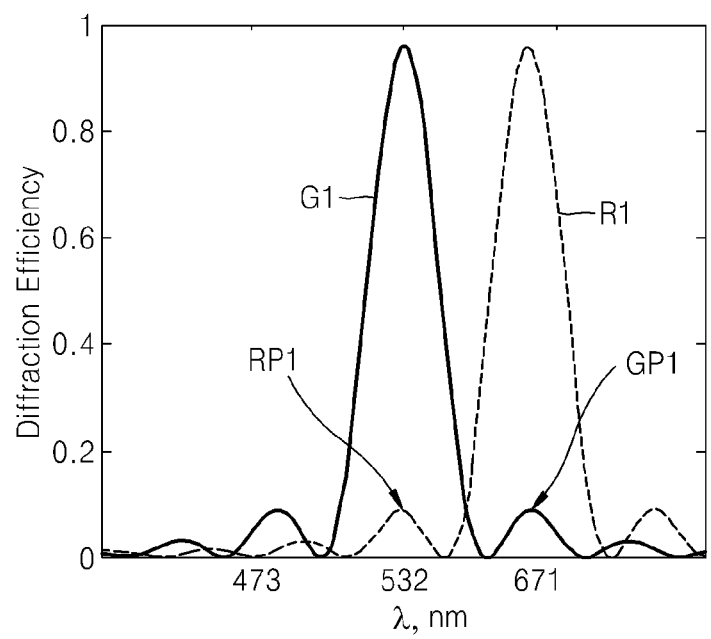
FIGS. 6A and 6B are comparison graphs illustrating a case where crosstalk is minimized in a mixed light by adjustment of thicknesses and refractive index modulations of hologram optical elements in an optical head for a hologram optical apparatus according to exemplary embodiments.
Figure 6B:
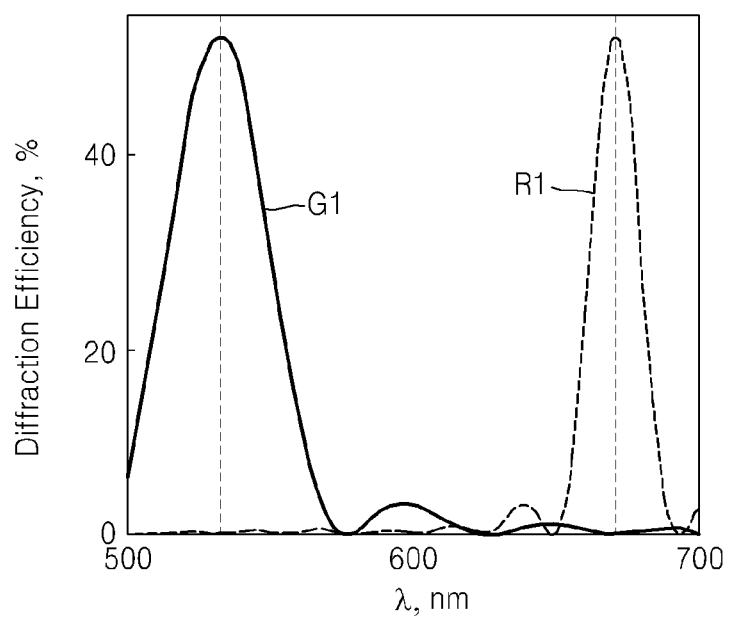

FIGS. 6A and 6B are comparison graphs illustrating a case in which crosstalk is minimized in the mixed light by adjustment of the thicknesses and refractive index modulations of hologram optical elements in an optical head for a hologram optical apparatus according to exemplary embodiments.

FIG. 6A illustrates diffraction superposition which may occur when the light is mixed. A first graph G1 shows a diffraction pattern for the green light G. A second graph R1 shows a diffraction pattern for the red light R. Referring to the first and second graphs G1 and R1, it may be seen that a first diffraction pattern GP1 of the first graph G1 is superposed on a 0th diffraction pattern of the second graph R1, and a first diffraction pattern RP1 of the second graph R1 is superposed on the 0th diffraction pattern of the first graph G1.

From FIG. 6B, it can be seen that superposition of diffraction patterns disappears by adjustment of thicknesses d and refractive index modulations Δn of the lighting hologram optical element and the composite hologram optical elements.

Referring to FIG. 6B, it can be seen that the $0^{th}$ diffraction pattern of the first graph G1 is not superposed on the diffraction pattern of the second graph R1, and the $0^{th}$ diffraction pattern of the second graph R1 is not superposed on the diffraction pattern of the first graph G1. This result may be caused by a fact that centers of the $0^{th}$ diffraction patterns of the mixed light, for example, the red and green light, are separated further than before the adjustment of the thicknesses d and the refractive index modulation Δn.

As shown in FIG. 6B, superposition between the mixed light is minimized by the adjustment of thicknesses d and refractive index modulations Δn of the lighting hologram optical element and the composite hologram optical element. Therefore crosstalk may be minimized.

As described above, according to the one or more of the above exemplary embodiments, a signal light generating unit and a reference light generating unit are laminated in an optical head for a hologram optical apparatus and the signal light generating unit may have a laminated structure on which optical waveguides for the red light R, the green light G and the blue light B are overlapped.

Therefore an optical head according to an exemplary embodiment may be smaller in volume that an optical head according to related art.

Crosstalk according to light mixing that occurs in a signal light generating process can be minimized by properly adjusting thicknesses and refractive index modulations Δn of hologram optical elements used in the signal light generating unit.

Efficiency can be maximized by separating R, G and B respectively and matching one wavelength with one hologram optical element.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An optical head for a hologram optical apparatus, the optical head comprising:
    a reference light unit which generates a reference light for hologram recording;
    a signal light unit which generates a signal light for hologram recording; and
    a light source unit which provides light to the reference light unit and the signal light unit,
    wherein the reference light unit and the signal light unit are vertically stacked; and
    wherein the signal light unit comprises:
        a single optical waveguide onto which the signal light from the light source unit is incident;
        a composite hologram optical element and a lighting hologram optical element, each comprising a three layer hologram corresponding to red, green, and blue light, disposed on the single optical waveguide;
        a single optical modulator which modulates light output from the single optical waveguide; and
        a lens which condenses light emitted from the single optical modulator onto the hologram recording layer.

2. The optical head for a hologram optical apparatus according to claim 1, wherein the lens comprises a holographic Fourier lens.

3. The optical head for a hologram optical apparatus according to claim 1, wherein the reference light generating unit comprises:
    an optical waveguide;
    an upper composite hologram optical element disposed on a top surface of the optical waveguide; and
    a lower composite hologram optical element disposed on a bottom surface of the optical waveguide.

4. The optical head for a hologram optical apparatus according to claim 3, wherein the upper and lower composite hologram optical elements, each comprise a three layer hologram.

5. The optical head for a hologram optical apparatus according to claim 1, wherein the light source unit comprises:
    a first light source, a second light source, and a third light source;
    a reflection unit which reflects light emitted from the first light source, the second light source, and the third light source; and
    a mirror which reflects light from the reflection unit to the signal light unit.

6. The optical head for a hologram optical apparatus according to claim 5, wherein the first light source comprises a first laser which emits light of a first color, the second light source comprises a second laser which emits light of a second color, different from the first color, and the third light source comprises a third laser which emits light of a third color, different from the first color and the second color.

7. The optical head for a hologram optical apparatus according to claim 6, wherein the first laser is one of a continuous wave (CW) laser and a quasi CW laser, the second laser is one of a CW laser and a quasi-CW laser, and the third laser is one of a CW laser and a quasi-CW laser.

8. The optical head for a hologram optical apparatus according to claim 5, wherein the reflection unit comprises a mirror and a beam splitter.

9. An optical head for a hologram optical apparatus, the optical head comprising:
    a reference light unit which generates a reference light for hologram recording;
    a signal light unit which generates a signal light for hologram recording; and
    a light source unit which provides light to the reference light unit and the signal light unit,
    wherein the reference light unit and the signal light unit are vertically stacked, and
    wherein the signal light unit comprises:
        a plurality of optical waveguides stacked vertically;
        a composite hologram optical element and a lighting hologram optical element, each comprising a single layer hologram, disposed on each of the plurality of optical waveguides;
        an optical modulator which modulates light output from the plurality of optical waveguides; and
        a lens which condenses light emitted from the optical modulator onto the hologram recording layer.

10. The optical head for a hologram optical apparatus according to claim 9, wherein the plurality of optical waveguides comprises an optical waveguide for red light, an optical waveguide for green light, and an optical waveguide for blue light, wherein the optical waveguide for red light, the optical waveguide for green light, and the optical waveguide for blue light are vertically stacked.

11. The optical head for a hologram optical apparatus according to claim 9, wherein the composite hologram optical element and the lighting hologram optical element are both disposed on one of a top surface and a bottom surface of each of the plurality of optical waveguides.

12. The optical head for a hologram optical apparatus according to claim 9, wherein the lens comprises a Fourier lens.

13. The optical head for a hologram optical apparatus according to claim 9, wherein the composite hologram optical elements do not overlap each other in a vertical direction.

14. The optical head for a hologram optical apparatus according to claim 13, wherein the light source unit comprises a first light source, a second light source, and a third light source, wherein each of the first light source, the second light source, and the third light source directs light to the composite hologram optical element disposed on one of the plurality of optical waveguides.

15. The optical head for a hologram optical apparatus according to claim 9, wherein thicknesses of the composite hologram optical elements are the same.

16. The optical head for a hologram optical apparatus according to claim 9, wherein thicknesses of the lighting hologram optical elements are the same.

17. The optical head for a hologram optical apparatus according to claim 9, wherein thicknesses of the composite hologram optical element and the lighting hologram optical element disposed on each of the optical waveguides are the same.

18. The optical head for a hologram optical apparatus according to claim 9, wherein refractive index modulations of the composite hologram optical elements are the same.

19. A method of operating an optical head of a hologram optical apparatus, the method comprising:
   a light source unit generating reference light and signal light;
   a reference light unit directing the reference light from the light source unit to a hologram recording layer;
   a signal light unit directing the signal light from the light source unit to the hologram recording layer;
   wherein the reference light generating unit and the signal light generating unit are vertically stacked;
   wherein the signal light generating unit comprises an optical waveguide, a composite hologram optical element disposed on the optical waveguide, and a lighting hologram optical element disposed on the optical waveguide; and
   wherein the method further comprises adjusting at least one of a thickness and a refractive index modulation of the composite hologram optical element.

20. The method according to claim 19, wherein the optical waveguide comprises
   a plurality of optical waveguides which are vertically stacked; and
   wherein a composite hologram optical element and a lighting hologram optical element, each comprising a single layer hologram, are disposed on each of the optical waveguides.

21. The method according to claim 20, wherein the composite hologram optical elements do not overlap each other.

22. The method according to claim 21, wherein the light source unit generating the reference light and the scanning light comprises the light source unit illuminating each of the composite hologram optical elements at certain time intervals.

23. The method according to claim 19, wherein the composite hologram optical element and the lighting hologram optical element each comprise a three layer hologram.

* * * * *